United States Patent
Suzuki et al.

(10) Patent No.: US 9,056,281 B2
(45) Date of Patent: Jun. 16, 2015

(54) FILTRATION MODULE

(75) Inventors: Yasuji Suzuki, Tokyo (JP); Eric McNamara, Nashua, NH (US); Timothy Towle, Lee, NH (US)

(73) Assignee: Entegris, Inc., Billerica, MA (US)

( * ) Notice: Subject to any disclaimer, the term of this patent is extended or adjusted under 35 U.S.C. 154(b) by 1167 days.

(21) Appl. No.: 11/922,551

(22) PCT Filed: Jul. 11, 2006

(86) PCT No.: PCT/JP2006/314136
§ 371 (c)(1),
(2), (4) Date: Mar. 11, 2009

(87) PCT Pub. No.: WO2007/007898
PCT Pub. Date: Jan. 18, 2007

(65) Prior Publication Data
US 2009/0321339 A1    Dec. 31, 2009

Related U.S. Application Data

(60) Provisional application No. 60/698,267, filed on Jul. 11, 2005.

(30) Foreign Application Priority Data

Jul. 11, 2005   (JP) ................ 2005-201780

(51) Int. Cl.
*B01D 29/13*    (2006.01)
*B01D 63/06*    (2006.01)
*B01D 29/21*    (2006.01)

(52) U.S. Cl.
CPC .............. *B01D 63/067* (2013.01); *B01D 29/21* (2013.01); *B01D 2201/0407* (2013.01);
(Continued)

(58) Field of Classification Search
CPC ......................... B01D 29/21; B01D 2201/415
USPC ............................ 210/232, 322, 323.1, 323.2
See application file for complete search history.

(56) References Cited

U.S. PATENT DOCUMENTS 3,850,813 A    11/1974  Pall et al.
3,876,545 A *   4/1975  Norwood ..................... 210/236
(Continued)

FOREIGN PATENT DOCUMENTS

CN    1201442 A    12/1998
DE    2353610      10/1973
(Continued)

OTHER PUBLICATIONS

European Search Report, mailed Jul. 31, 2009 for corresponding European Application No. 06768261.7-2113.
(Continued)

*Primary Examiner* — Tony G Soohoo
*Assistant Examiner* — Peter Keyworth
(74) *Attorney, Agent, or Firm* — Hamilton, Brook, Smith & Reynolds, P.C.; Tanzina Chowdhury, Esq.

(57) ABSTRACT

A purification module is provided comprising a plurality of purification cartridges, a support for the cartridges, a manifold and a bowl. In one embodiment the support for the cartridges has two pitched partial screw threads on opposing surfaces which mate with pitched screw flights on the manifold when the partial screw threads are rotated into the screw flights. The support includes fluid passageways for directing filtered fluid from the filtration cartridges, through the support and into the manifold. In another embodiment, a purification module is provided comprising a purification cartridge, a manifold and a bowl. The purification cartridge has two pitched partial screw threads on opposing surfaces of the cartridge outlet which mate with screw flights on the manifold when the partial screw threads are rotated into the mating screw flights.

15 Claims, 14 Drawing Sheets

(52) U.S. Cl.
CPC ............... *B01D 2201/0415* (2013.01); *B01D 2201/0453* (2013.01); *B01D 2201/24* (2013.01); *B01D 2201/291* (2013.01); *B01D 2201/4015* (2013.01); *B01D 2313/04* (2013.01); *B01D 2313/105* (2013.01); *B01D 2313/20* (2013.01); *B01D 2313/44* (2013.01)

(56) References Cited

U.S. PATENT DOCUMENTS

| | | | |
|---|---|---|---|
| 4,139,468 | A | 2/1979 | Rosaen |
| 4,331,535 | A | 5/1982 | Pett |
| 4,402,828 | A * | 9/1983 | Edens .................. 210/323.2 |
| 4,909,937 | A * | 3/1990 | Hoffmann et al. ............ 210/315 |
| 5,114,572 | A | 5/1992 | Hunter et al. |
| 5,846,416 | A | 12/1998 | Gullett |
| 6,096,207 | A | 8/2000 | Hoffman |
| 6,217,754 | B1 | 4/2001 | Ros |
| D472,299 | S | 3/2003 | Fritze |
| 6,615,990 | B1 * | 9/2003 | Jokschas et al. ............ 210/457 |
| 6,635,175 | B2 | 10/2003 | Stankowski |
| 6,655,860 | B2 | 12/2003 | Nozawa et al. |
| 6,977,040 | B2 * | 12/2005 | McCune et al. ............ 210/248 |
| 2002/0016242 | A1 | 2/2002 | Nozawa et al. |
| 2003/0019819 | A1 * | 1/2003 | Fritze .................. 210/767 |
| 2004/0129624 | A1 | 7/2004 | Hamlin et al. |
| 2004/0159600 | A1 * | 8/2004 | Stankowski ............ 210/232 |
| 2004/0251192 | A1 * | 12/2004 | Fritze et al. ............ 210/321.6 |
| 2006/0196822 | A1 * | 9/2006 | Koehler et al. ............ 210/437 |

FOREIGN PATENT DOCUMENTS

| | | | | |
|---|---|---|---|---|
| DE | 3405929 | A1 | 6/1984 | |
| DE | 3335938 | C1 | 4/1985 | |
| DE | 4131353 | A1 | 10/1992 | |
| DE | 299 11 829 | | 7/1999 | |
| DE | 19827297 | A1 | 12/1999 | |
| DE | 103 48 301 | A1 | 5/2005 | |
| EP | 1073506 | B1 | 5/2003 | |
| JP | 63-18485 | U | 2/1988 | |
| JP | 3-83610 | A | 8/1991 | |
| JP | 06-03408 | U | 1/1994 | |
| JP | 8-323105 | A | 12/1996 | |
| JP | 09-122407 | | 5/1997 | |
| JP | 9-264436 | A | 10/1997 | |
| JP | 11-90119 | A | 4/1999 | |
| JP | 11-253936 | A | 9/1999 | |
| JP | 2000-279713 | | 10/2000 | |
| JP | 2000279713 | A * | 10/2000 | ............ B01D 29/07 |
| JP | 2002-507476 | | 3/2002 | |
| JP | 2002-102609 | | 4/2002 | |
| JP | 2002-336847 | A | 11/2002 | |
| JP | 2002-542026 | U | 12/2002 | |
| JP | 2003-53335 | A | 2/2003 | |
| JP | 2003-154217 | A | 5/2003 | |
| JP | 2005-521546 | A | 7/2005 | |
| WO | WO 99/48591 | | 9/1999 | |
| WO | 00/64560 | A1 | 11/2000 | |
| WO | 02/16004 | A1 | 2/2002 | |
| WO | 03/082434 | A1 | 10/2003 | |

OTHER PUBLICATIONS

Singapore Search Report mailed??? for corresponding Singapore Application No. 200718187-8.
English Translation of Japanese Communication mailed Mar. 8, 2011 in corresponding Japanese Patent Application No. 2007-555404.
Japanese Communication, with English translation, mailed Feb. 4, 2014 in corresponding Japanese patent application No. JP 2012-241551.

* cited by examiner

FILTRATION MODULE

This application claims priority to Japanese Patent Application No. 2005-201780, filed Jul. 11, 2005, and priority to U.S. Provisional Application No. 60/698,267 filed Jul. 11, 2005, the contents of each of these applications incorporated herein by reference in their entirety.

The control of particulate contaminants in a filtration process such as in the semiconductor industry requires the use of ultraclean filters having membranes that remove submicron particles. It is well known that any particle that is deposited on a semiconductor wafer produces a defect when the particle is sufficiently large. Typically in the semiconductor industry, failed defects can be produced by particles as small as about one tenth of the smallest features of the semiconductor chip. Therefore, membrane filters are used in numerous process steps for producing semiconductor chips to purify both working liquids and gases.

Although many different designs have been developed for a filtration module used in an ultrapure liquid filtration, two designs are prevalent. In one module design, liquid to be filtered flows from one end of the filtration module to the other end. In this case of the filtration modules, the feed and permeate connections are located at opposite ends of the filter thereby forcing the liquid flow to move from one end to the other. This flow configuration is referred to as an in line flow configuration. These filtration modules suffer from two disadvantages. First, they are more difficult to connect to the process equipment since the module is sandwiched between two sets of connections. Second, any free liquid remaining within the module quickly drains upon disconnection of the module because at least one connection is positioned at the bottom of the module.

A second filtration modular design locates all of the connections at the same end of the module. In this type of module, the feed and permeate ports are typically horizontally oriented at the top of "head" or manifold end of the module on opposite sides thereof. Due to their shape, these modules are referred to as having a T, L or U configuration. This configuration facilitates connection of the head or manifold to the remaining portion of the filtration module comprising the bowl and the filtration cartridge positioned within the bowl. In this design, the bowl and filtration cartridge comprise separate elements. Thus, when constructing the filtration module, the filtration cartridge and the bowl are separately secured to and sealed to the manifold head. In addition, upon completion of filtration, the bowl and cartridge are separately removed from the head.

It has been proposed in U.S. Pat. No. 5,114,572 to provide a filter assembly which cooperates with a bowl to produce a filter cartridge-bowl construction which can be demounted as a single unit from a manifold. The filter cartridge is connected to the bowl by bayonet connections on the cartridge which fit into grooves within the interior surface of the bowl. This bayonet connection requires the partial screw threads extending from the outside surface of the filter cartridge be positioned in a two step process into grooves that extend vertically within the bowl and then into grooves which extend horizontally within the bowl. This connection configuration requires that the cartridge first be moved vertically into the vertical grooves and then be rotated into the horizontal grooves in a two step process when mounting the cartridge into the bowl. Conversely, when it is desired to remove the cartridge from the bowl upon completion of a filtration process, the cartridge must be rotated and lifted from the bowl in a single motion. Since removal of the cartridge from the bowl requires application of force on the fluid conduit located at the top of the cartridge, and since the diameter of this conduit is smaller than the cartridge diameter there is no leverage of the application force on the cartridge. This, in turn, requires application of considerable force on the cartridge when effecting its removal from the bowl that may require the use of a hand held tool. The application of a rotational force and a lifting force as a single motion increases the difficulty of separating the bowl from the filter cartridge. Separation of the cartridge from the bowl is particularly difficult when toxic or corrosive fluids have been filtered by this filtration device.

U.S. Pat. No. 6,635,175 discloses a filtration module comprising a manifold, a filtration cartridge and a bowl wherein the filtration cartridge and bowl are joined together by means of lugs on the filtration cartridge which fit into slots on the bowl. The lugs are secured in the slots by moving the cartridge vertically and then rotating the cartridge in a two step process.

Further, current designs have the cartridge seal against and be lightly (friction fit) held to the manifold. Any application of back pressure when applied to the cartridge can cause the cartridge to unseat from the manifold, rendering it ineffective for filtration.

Presently available filtration modules are capable of accommodating only one filtration cartridge.

Accordingly, it would be desirable to provide a filtration module construction having a plurality of filtration cartridges which avoids the need for applying force in a plurality of directions of movement to effect removal of a plurality of cartridges from a manifold. Such a filtration module would provide an increased filter surface area per unit volume of filtration module as compared to a filtration module having a single cartridge. Such a construction would also promote ease of separating the cartridge from the manifold and would eliminate the danger to the worker in removing the filtration cartridge subsequent to filtration.

SUMMARY OF THE INVENTION

Embodiments of the present invention include an apparatus that can comprise a manifold and a bowl or cap joined together in a fluid tight manner. The cap and manifold house a porous purification membrane that is mounted, joined or otherwise connected to the support. The porous purification membrane may be used to remove particulate, molecular, ionic, or combination of these contaminants from a liquid. The support has membrane supporting portion and a support outlet. The support outlet fits inside of an outlet conduit of the manifold and the support outlet can have two or more angled structures that engage with angled mating structures of the outlet conduit of the manifold with less than a full turn. In some embodiments the support outlet and manifold engage with a turn of about 90 degrees or less. The support outlet and manifold engage to form a fluid tight seal between the support outlet and outlet conduit of the manifold. The porous purification membrane and bowl are in fluid communication with the manifold in a manner which prevents mixing of a fluid or liquid feed to the apparatus and the filtered permeate and or purified liquid removed from the apparatus.

In some embodiments of this invention, a filtration and or purification module is provided comprising a manifold, a plurality of filtration and or purification cartridges, a support for the filtration and or purification cartridges and a bowl. The filtration and or purification cartridges and manifold are joined together through the support. The support has angled structures such as partial screw threads having a pitch which fit into mating angled structures such as screw flights in the manifold. The support and manifold are joined together in a fluid or liquid tight manner by positioning the pitched partial screw threads at the entrances of the mating screw flights and rotating the support to move the partial screw threads a portion or completely within the mating screw flights in a one step process. The filtration and or purification cartridges are sealingly positioned into holes or openings in the support in a manner which seals the exterior surface of the filtration and or purification cartridges from the interior surfaces of the filtration and or purification cartridges while permitting the filtered and or purified fluid to flow from the interior of the cartridges into the manifold. The bowl is joined to a mating portion or section of the manifold to completely enclose the cartridges during use of the filtration and or purification module. Alternatively, the partial screw threads can be provided on the manifold. These partial screw threads mate with screw flights on the support.

In some embodiments of this invention, a filtration and or purification module is provided comprising a manifold, a filtration or purification cartridge and bowl wherein the filtration and or purification cartridge and manifold are joined together by angled structures such as partial screw threads having a pitch on the cartridge outlet which fit into angled mating structures such as screw flights in the manifold. The filtration cartridge and manifold are joined together by positioning the partial screw threads at the entrances of the mating screw flights and rotating the cartridge to move the partial screw threads a portion or completely within the mating screw flights in a one step process. A handle or other grasping feature attached or formed in a portion of the cartridge can optionally be provided on a part of the cartridge, and preferably at an end opposite the end of the cartridge that is joined to the manifold. The handle or other feature can be grasped by the user in order to facilitate rotating the filtration cartridge into or out from the manifold. The bowl can be joined to a mating portion or section of the manifold to completely enclose the cartridge during use of the module. Alternatively in some embodiments, the partial screw threads can be provided on the manifold. These partial screw threads mate with mating screw flights on the filtration and or purification cartridge. The present invention also provides embodiments where the filtration and or purification cartridge have partial screw threads or the mating screw flights.

In some embodiments the partial screw threads or other angled structures on the support outlet and an outlet conduit of the manifold can have angle of between about 2 to about 25 degrees such that the support and manifold can engage and form a liquid tight seal or a seal that prevents mixing of the liquid to be treated from the treated liquid received from the cartridge. In some embodiments the angled structures on the support outlet and an outlet conduit of the manifold can have angle of between about 6 to about 8 degrees. In some embodiments the angled structures of the support outlet are partial screw threads.

In embodiments of the invention the support outlet and manifold form a liquid tight seal. The filtration and or purification cartridges and support and separately the bowl are in fluid communication with the manifold in a manner which prevents mixing of a fluid or liquid feed to the module and the treated, filtered and or purified, liquid removed from the module through the manifold. In some embodiments the seal between the support outlet and manifold seal is provided by one or more o-rings, gaskets, or a combination of these.

In some embodiments the filter and or purification membrane can be one or more cartridges mounted to the support. In other embodiments a filter and or purification membrane can be bonded to the support.

In some embodiments the manifold has one or more detents or other internal rib structures that can contact the support. The detents or other ribs can be use to hold the support or act as a stop for the support in the manifold while it is rotated to form a seal.

In some embodiments the purification support media cages can be flexible or comprise two or more sections that provide support to the purification media while allowing for thermal expansion of the cartridge. In some embodiments the outer cage for the purification and or filtration cartridge is a two piece construction. In some embodiments the configuration or flexibility of the cage permits use with fluids less than about 200° C. and in some cases less than about 160° C.

In some embodiments of the invention, the circumference of the support is larger than the corresponding circumference of the support outlet which provides leverage for sealing the support outlet with the manifold. In some embodiments the seal is formed by rotation the support by about 90 degrees or less.

The high flow purification and or filtration apparatus can be made from chemically resistant materials. In some embodiments it can be made from polymeric materials or composites of polymers and other materials such as ceramics, fibers, or other fillers. In some embodiments the apparatus is metal free. The engagement of the partially angled structure on the support outlet and manifold outlet eliminates the need for tie rods or pipes, positioning guides inserted into the filter or purifier core which can cause contamination of treated liquid. The engagement of the partially angled structure on the support outlet and manifold outlet eliminates the need for base and header plates, springs and other structures which make assembly and disassembly of filtration modules difficult and time consuming and can reduce fluid flow or create dead spots for flow in the housing. Embodiments of the invention can have a single seal for the purification cartridge at the outlet rather than having inlet and outlet seals. This invention relates to a membrane purification module that is more sanitary and is easier to replace and install than presently available filtration and or purification modules. In some embodiments of the present invention, the purification media is a membrane filtration module formed from a filtration cartridge, a retaining bowl and a manifold joined together. In other embodiments the purification media is a membrane filtration module having a support for a plurality of filtration cartridges; the membrane filtration module formed from a plurality of filtration cartridges, a support for the filtration cartridges, a retaining bowl and a manifold joined together.

The purification module in versions of the present invention may be used in the filtration, purification, or combination of these of liquids or other fluids used in but not limited to pharmaceutical, semiconductor, and flat panel display manufacturing processes. The purification module can be part of a re-circulation system or other apparatus where a cleaning liquid, an etchant bath, a slurry, reagent, or other liquid process chemical is pumped between a tank for processing and the purification module. The system or apparatus may include other components such as conduits, valves, flow controllers, pumps, pressure gauges, temperature, liquid purity sensors, or other sensors. In use when an indication that the purification capacity of the module has been reached, the flow of liquid in the system can be stopped, the liquid drained from the housing through the manifold, and the purification cartridge removed, or one or more individual cartridges joined to the support can be remove, or the support can be removed. New purification cartridges or purification media can be installed in the manifold or support and the two sealed together by engaging the angled structures of the support liquid outlet and mating angled structures of manifold. The manifold and cap are then sealed and a flow of fluid resumed through purification media.

BRIEF DESCRIPTION OF THE DRAWINGS

FIG. 1b is an isometric view of the joined support of FIG. 1a.

FIG. 10c is an isometric view of the purification module of FIG. 10a.

FIG. 10d is an isometric cross sectional view of the purification module of FIG. 10a.

DESCRIPTION OF SPECIFIC EMBODIMENTS

Figure 1A:
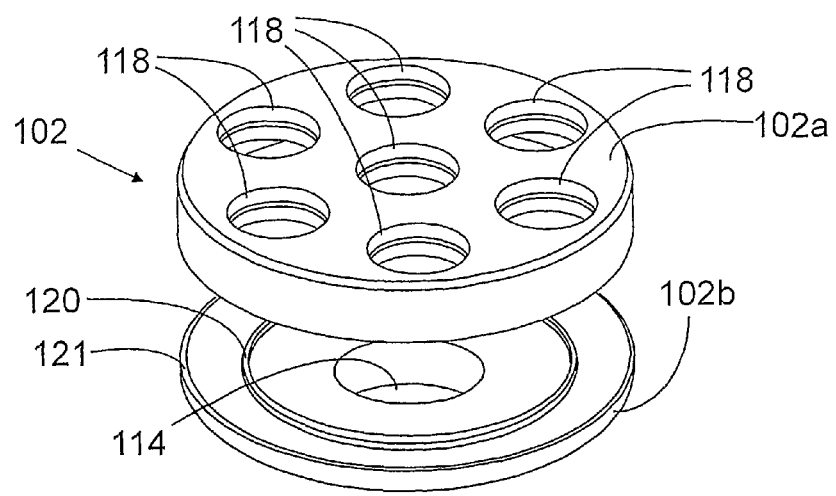
FIG. 1a is an isometric exploded view of a support for a plurality of filtration or purification cartridges of this invention.

Embodiments of the present invention include an apparatus that can comprise a manifold that is in fluid communication with an outlet from a membrane purification media, and a bowl or cap connected to the manifold. The bowl and manifold enclose the membrane purification media. In versions of the invention both the manifold and bowl can be polymeric materials or composite materials that include polymers. The bowl or cap and a section of the manifold are joined in a fluid tight manner, the seal can be reversibly made and broken by press fit, or compression of a polymeric sealing material such as one or more gaskets, o-rings, joint tape, or other materials. The seal between the bowl or cap and the manifold section may be and held by nuts and bolts, clamps, retaining ring, or other seal maintaining structures. In some embodiments the bowl is joined to a cylindrical section of the manifold. The height of the manifold section and bowl or cap may be varied to house the purification membrane.

The cap and manifold house a membrane purification media that is joined to a support that has a fluid outlet with one or more angled structures such as partial threads, screw flights, or other similar structures. In some embodiments the purification media may further utilize one or more porous core supports, one or more outer support cages, and endcaps. The purification media, core support, and cage support can be bonded between the support and an endcap. In other embodiments the purification membrane may be contained in one or more cartridges that can be joined or fluidly sealed by o-rings or similar articles to holes or openings in the support. The purification media and cap are in fluid communication and sealed with the manifold in a manner which prevents mixing of a fluid or liquid feed to the module and the filtered permeate and or purified liquid removed from the module.

The purification membrane can be flat sheet, pleated flat sheet, depth media, graded depth media, hollow fiber, or other porous, microporous. The porous media can have pores with a size of less than about 10 microns in some embodiments, less than about 1 microns in other embodiment, and less than about 0.01 microns in still other embodiments. In still other embodiments yet, the purification media can be a nanoporous material, about 100 nanometers to about 1 nanometer or less.

In embodiments of the invention, the support has membrane supporting portion and a support outlet. The support outlet fits inside a portion of the outlet conduit of the manifold and in some embodiments can be essentially coaxial or surrounded by an inside surface of an outlet conduit of the manifold. The length of the fluid outlet can be varied to the size of the outlet conduit of the manifold as well as the stability requirements of the support. The support outlet has two or more angled structures, such as but not limited to flights, grooves, fins or partial thread structures that engage with angled mating structures of the outlet conduit of the manifold with a turn of about 90 degrees or less of the support to form a fluid tight seal between the support outlet and outlet conduit of the manifold. The fluid tight seal can be a reversible seal and can be formed by press fit between the support outlet and outlet conduit of the manifold or by compression of a polymeric sealing material such as gasket, o-ring, or one or more o-rings between the support and the manifold, in some embodiments the seal is between the support outlet and outlet conduit of the manifold. In some embodiments the seal can be formed by compression of a polymeric sealing material such as gasket, o-ring, or one or more o-rings between the support outlet and outlet conduit of the manifold.

In embodiments of the invention angle structures from the support outlet are engaged with angled mating structures from the manifold to form a liquid tight seal between a surface of the support and the manifold. The angled structures on the outlet or manifold are discontinuous along the circumference of the support outlet and discontinuous along a portion of the outlet conduit of the manifold. The seal prevents mixing of a liquid filtered and or purified by the purification media with untreated liquid inlet to the manifold. The seal can be formed by any support and manifold surfaces that contact each other by engaging the angled structures. For example, in some embodiments the bottom of a support like 802b may contact a surface of the manifold such as 817 and be sealed by one or more o-rings or gaskets (not shown). In other embodiments the seal can be formed for example between a support outlet 814 and manifold outlet conduit 833 surface as illustrated in FIG. 8b. The one or more angles structures that engage the support and manifold provide a seal that can resist a back pressure of fluid in the manifold outlet, in some embodiments the seal is maintained with a liquid back pressure of greater than about 2 psi, in other embodiments the seal is maintained with a liquid back pressure of greater of greater than about 5 psi, and in still other embodiments the seal is maintained with a back pressure of greater than about 10 psi. The engagement or the mated angled structures maintains the separation of purified and or filter liquid in the manifold outlet from the fluid to be treated upstream of the membrane in the housing.

In embodiments of the invention, purification refers to removal of particles, removal of molecular contaminants, removal of ionic contaminants, or any combination of these from a fluid or a liquid. In slurry filtration applications the purification media may be used to maintain a desired distribution of slurry particle sizes in the slurry. Purification media, purification membrane, or purification cartridges in embodiments of the invention can be used to remove of particles, remove molecular and or ionic contaminants, or any combination of these from a fluid or a liquid to be treated.

In embodiments of the invention the bowl or cap and manifold section can be joined together to form a liquid or fluid tight seal that can be reversibly made and broken. The seal can include one or more sealing materials such as but not limited to elastomeric gaskets, o-rings, sealing tape, or it may consist of a press fit between suitable sealing surfaces of the cap and manifold section. The seal and position of the cap and manifold section can be secured with a retainer structure including but not limited to a retaining ring, nuts and bolts, clamps or other suitable fixtures. In some embodiments the bowl and manifold are joined by a retaining ring with a flange.

In some embodiments of the invention, the support for the purification cartridges and the manifold are joined together with angled structures that are pitched partial screw threads which fit into mating screw flights in a one step process. The partial screw threads on the support have a pitch and mate with screw flights in the manifold so that the purification cartridge(s) or media can be joined in a sealing relationship with the manifold by rotating the support into the manifold in one step. In some embodiments the support can have two partial screw threads to facilitate alignment with the mating screw flights. The partial screw threads may be positioned about 180 degrees from each other. More than two partial screw threads such 3 or 4 can be utilized if desired. When using 3 partial screw threads, they can be positioned about 120 degrees from each other. When using 4 partial screw threads, two pairs of two each can be positioned about 180 degrees from each other. In an alternative embodiment of this invention, the screw flights can be positioned on the support for the purification cartridges while the pitched mating partial screw threads are positioned on the manifold. In this embodiment, the manifold and purification cartridge also are sealingly joined in a one step rotation process through the support. In some embodiments, the pitched partial screw threads can be positioned on the support for a filtration cartridge. The one step process for joining or separating the support for the purification cartridge and manifold provides substantial advantage over the two step process of the prior art. In some embodiments the purification cartridge is a particle filter. In other embodiments the purification cartridge removes one or more molecular and or ionic contaminants from the liquid. In some embodiments the purification cartridge removes a combination of particles and one or more molecular or ionic contaminants from the liquid.

Subsequent to the use of the filtration module, the bowl can be detached from the manifold to expose the end of the filtration cartridge having or provided with a handle or other grasping feature. The filtration cartridge can then be rotated by applying force to the handle to remove the pitched partial screw threads of the support from the slots. A new filtration cartridge then is positioned into the manifold. A handle, tabs, raised structures, or recessed structures, for example but not limited to 709, can be attached, formed, or incorporated into the an endcap like 731 of the purification or filtration cartridge 706 to facilitate a one step engagement of the purification cartridge with the manifold and provide mechanical leverage to form or break the seal between the manifold and a support or purification cartridge. The one step process for joining or separating the cartridge and manifold in embodiments of the present invention provides substantial advantage over the use of lugs to secure the cartridge to the bowl and the rotating the cartridge in a two step process.

In some embodiments the purification module can be provided with a vent and or a drain which can be open or closed with plugs. The vent and drain permit positioning the purification module in a vertical position or in a horizontal position during use so that the purification module can be drained subsequent to completing its use in a purification process. Subsequent to the use of the purification module, the bowl or cap can be detached from the manifold to expose the one or more porous purification media or cartridges joined to the support. Depending upon the configuration of the purification module the support and manifold can be engaged or disengaged in different ways. For example, a porous purification media joined to a support can be engaged or removed as a single unit from the manifold; a support with one or more joined purification cartridges can be engaged or removed from the manifold as a single unit; or for a support with one or more joined purification cartridges, the cartridges can be individually removed from the manifold with the support in place and the cartridges replaced with new ones by joining them to the support.

Figure 1B:
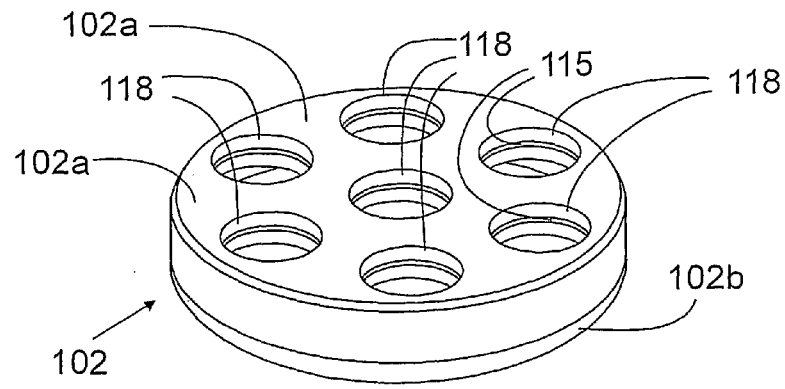
Figure 1C:
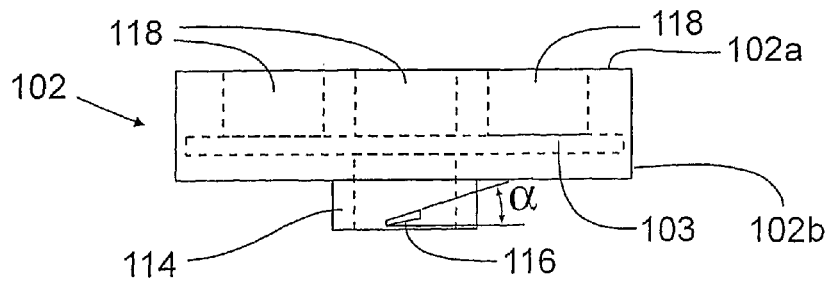
FIG. 1c is a side view of the support of FIG. 1a illustrating the plenum, partial angled structures on the support outlet and openings for purification cartridges.

Referring to FIGS. 1a, 1b and 1c, the support 102 may be formed from an upper support plate 102a having one or more or a plurality of holes or openings 118 sized to receive filtration and or purification cartridges (see for example cartridge 206 in FIG. 2a and FIG. 2b) and a lower support plate 102b. The upper plate 102a and lower plate 102b are show in FIG. 1a as being spaced apart, but the may be joined together to form the support 102 as depicted in FIG. 1c. Support 102 can have a plenum 103 which allows fluid flow from filtration or purification cartridges which fit and are sealingly joined into openings 118. Liquid and flows through plenum 103 and support fluid outlet 114. In some embodiments support 102 has a plenum 103 which allows fluid flow from filtration or purification cartridges which fit and are sealingly joined into openings 118. Liquid treated by the purification media flows through plenum 103 and into a manifold through support fluid outlet 114. In some embodiments, for example the single large purification cartridge 706 illustrated in FIG. 7, an upper plate like 102a is absent and lower plate 102b (similar to 702b) provides support the purification media and an liquid outlet 114 for the cartridge. The purification cartridge lower support plate can have one or more optional ridges 120 and 121 that may be used to align membrane and supports and or for bonding during purifier and or filtration cartridge construction. For example, the assembled filter of FIG. 8 shown in cross section is illustrated with manifold inlet 826 and outlet 828, and further illustrates a purification cartridge 806 with porous inner core 812, porous purification membrane 808, and outer support 810b all of which are shown between optional ridges 820 and 821 of support plate 802b.

One or more partial screw threads can be positioned on the fluid outlet of the support. For example, as shown in FIG. 1c, the support 102 has fluid outlet 114 with pitched partial screw threads 116 (only one shown). In some embodiments the pitched partial screw threads are positioned on opposing surfaces of the fluid outlet 114. The partial screw threads 116 can have a pitch or angle ($\alpha$) between about 2 degrees and about 25 degrees, in some embodiments the angle can be between about 6 degrees and about 8 degrees. The holes or openings 118 in the support like 102a or 102 can be provided with o-rings, grooves, or a combination of these 115 to join the support 102 and cartridges to provide a fluid seal between the support 102 with filtration or purification cartridges like 306 positioned within openings 118. The partial screw threads 116 fit into mating screw flights on the manifold. Any sealing means other than o-rings, for example polymeric or elastomeric tapes, gaskets, or o-rings can be utilized. In some embodiments the angled structures provides movement of the support outlet about 30 millimeters into the manifold outlet conduit when they are engaged.

Figure 2A:
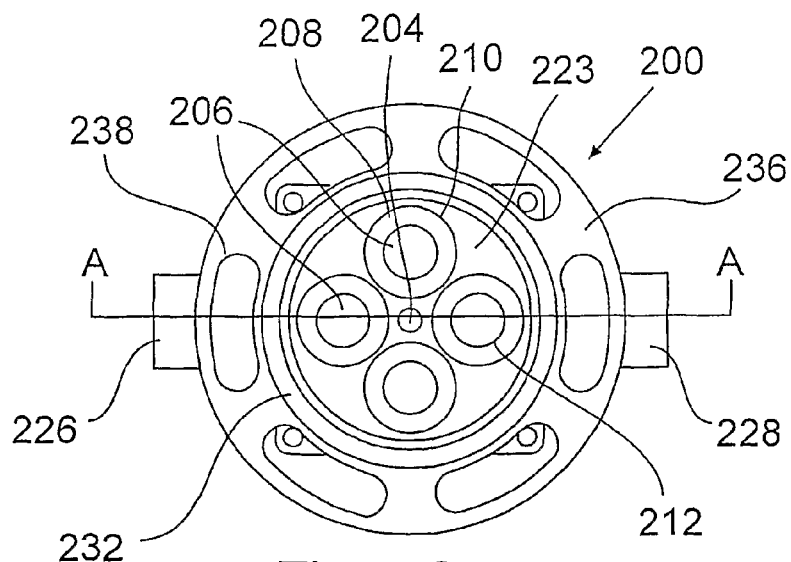
FIG. 2a is a top view of an embodiment of a purification module that includes one or more purification cartridge joined to a support.
Figure 2B:
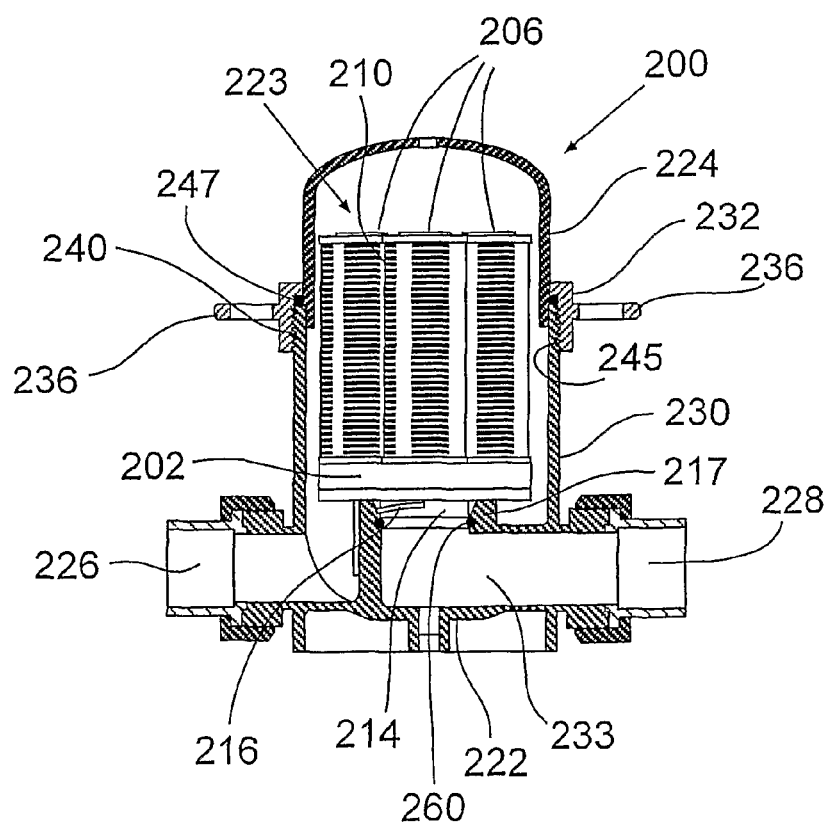
FIG. 2b is a cross sectional view of the purification module of FIG. 2a taken along line A-A.

Referring to FIG. 2a and FIG. 2b, an embodiment of a filtration or purification module 200 of this invention includes filtration or purification cartridges 206 that can have an outer porous cage 210 and an inner porous cage 212, a purification media 208 that can remove contaminants from the fluid. The media can be for example, a polymeric porous or microporous membrane, a porous media with ion exchange groups or other molecular contaminant removal groups. The module includes a filtration cartridge support 202, a manifold 222 and a bowl or cap 224 with optional vent port 204. In embodiments of the present invention the terms bowl and cap can be used interchangeably. The manifold 222 is provided with a fluid inlet 226 and a fluid outlet 228 which can optionally include sealing surfaces for gaskets, o-rings, and the like to connect the module to a liquid flow path. The manifold 222 is conveniently formed integrally with a manifold section 230, which can be cylindrical, which mates in sealing relationship with bowl 224 utilizing a retainer or rotatable lock ring 232. Lock ring 232 can be provided with a flange 236 with optional openings 238 which facilitates rotating the lock ring 232 and helps maintains the shape of the housing and cylindrical section 230 within specified tolerance for a leak free seal under module operating pressures and temperatures. The bowl or cap 224 can have a vent 204 from a volume 223 within the housing above the cartridges 206 or other membrane joined to the support 202. The lock ring 232 is positioned on the bowl 224 and is provided with threads 240 which mate with threads 245 on the outer surface of cylindrical section 230. When the lock ring 232 is rotated, bowl 224 can be sealed to cylindrical section 230 utilizing an o-ring 247. Filter cartridges 206 can be sealed to the support 202 by o-rings 115 such as illustrated in FIG. 1b. The manifold 222 can be configured to have an opening in the surface of manifold outlet conduit 217 that accepts or accommodates support outlet 214 and receives the filtered liquid and or purified liquid which can be removed from the apparatus 200 by outlet 228. By engaging angles structures such as partial threads and screw flights of the support outlet 214 and the manifold outlet conduit 233, the support outlet 214 can be sealed to the manifold outlet conduit 233 interior surface. The seal provides a fluid or liquid tight seal between the liquid to be filtered or purified and the filtered or purified liquid. The seal between the support and manifold may be formed using an elastomeric material, a press fit, or combinations of one or more of these. An example of a seal between 214 and 217 is illustrated by the non-limiting example of o-ring 260.

FIG. 2a and FIG. 2b illustrate an apparatus comprising a manifold 222 and a bowl or cap 224 joined in a fluid tight manner to a section 230 of the manifold 222. The bowl 224 and manifold 222 house a purification membrane 208 mounted or joined to a support 202. The support has membrane supporting portion (see for example 102a in FIG. 1a and openings 118) and a support outlet 214 where the support outlet 214 fits into, and in some versions is essentially coaxial with, the inside of a manifold outlet conduit 233 with an opening in the manifold surface 217. The support outlet 214 has two or more angled structures 216 such as but not limited to flights, grooves, fins or partial thread structures that engage with angled mating structures of the outlet conduit 233 of the manifold with a turn of about 90 degrees or less of the support 202. The engagement of the support 214 and manifold outlet conduit 233 forms a fluid tight seal 260, for example but not limited to a reversible seal by press fit, polymeric sealing material such as gasket, o-ring, or one or more o-rings between the support outlet 214 and outlet conduit 233 of the manifold 222. In some embodiments the angled structures 216 engage and stop with less than a full turn of the support 202 to form a fluid tight seal between the support 202 and manifold 222. In some embodiments the support 202 and manifold 222 engage and stop with a turn of about 90 degrees or less of the support 202. The purification membrane can be part of one or more cartridges 206 with the purification membrane 208, the cartridges joined to the support 202.

Figure 7:
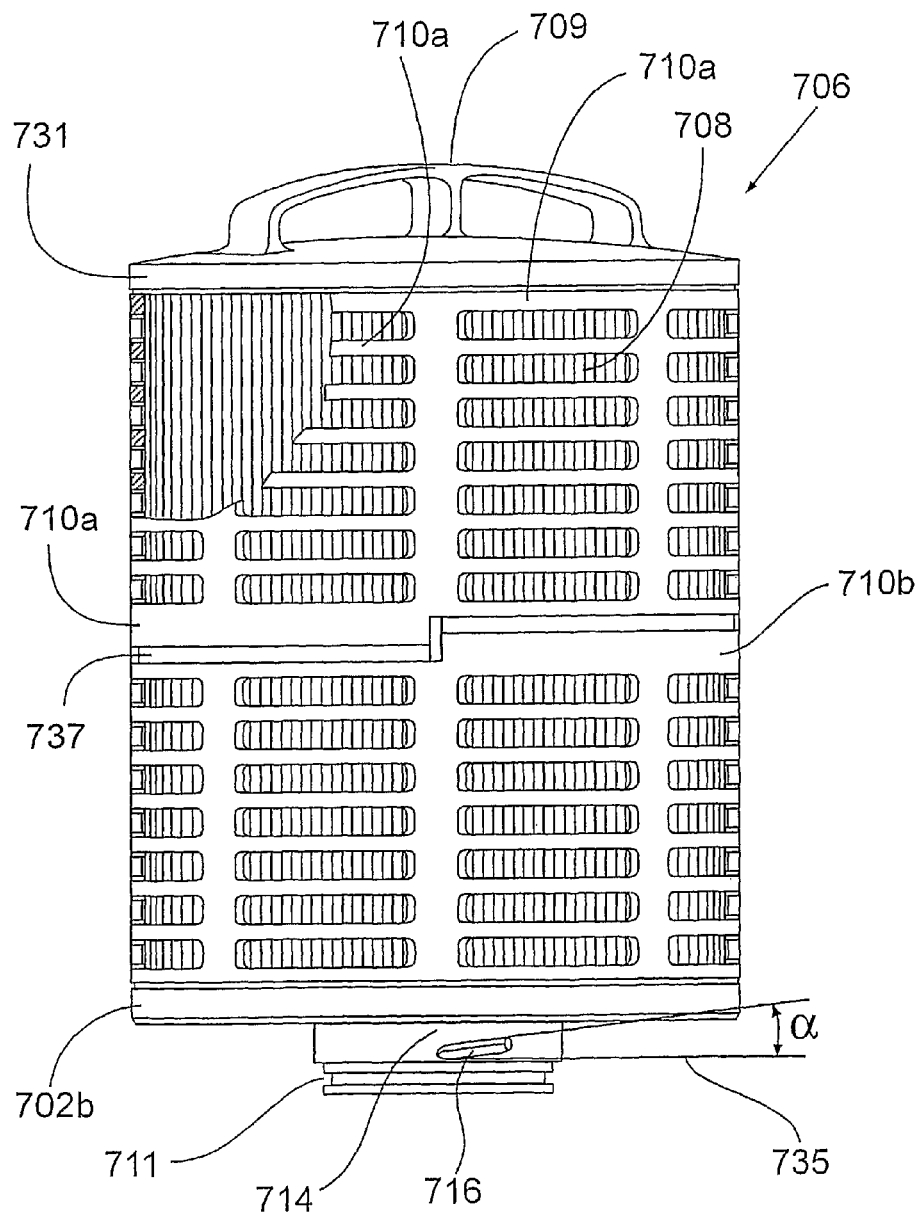
FIG. 7 is a side view of a purification cartridge in an embodiment of the invention.

In some embodiments the inner or outer membrane support can be a single piece construction. In other embodiments either the inner and or the outer cage support for the membrane can be made from two or more pieces to allow for thermal expansion under higher temperatures. For example, a non-limiting example of a two piece outer cage is illustrated in FIG. 7 where cage portions 710a and 710b form the outer cage for the filtration or purification device 706.

A retainer can be used to seal the cap or bowl with a section of the manifold. The retainer provides support to the bowl and section of the manifold under conditions of use and maintains the seal. The retainer maintains the seal between the bowl or cap and the section of the manifold under the pressure of the fluid; in some embodiments the pressure is that expected during a semiconductor manufacturing operation, in other embodiments the pressure is that expected in flat panel display processing; in still other embodiment the pressure is less than about 60 psi. In versions of the invention illustrated in FIG. 2 or FIG. 10b, the retainer can be a locking ring 232 or 1032 that can have a flange 236 or 1036. The flange 236 or 1036 can have one or more optional voids 238 or 1038 that permit a user to grasp the retainer and can facilitate rotation of the locking ring. The flange 236 or 1036 can provide additional dimensional stability to the locking ring, especially at temperatures above room temperature and operating pressures where expansion of the bowl or cap 224 or 1024 and manifold section 230 or 1030 can occur; the retaining ring 232 or 1032 maintains the seal between them in a fluid or liquid tight manner.

In embodiments of the invention the bowl or cap and section of the manifold are shaped so that they can be joined together to form a liquid or fluid tight seal. While there are no limitations on the shape of the bowl and manifold, in some embodiments the bowl and manifold section can have a circular shape and be joined in a liquid tight seal by a retainer.

Figure 4B:
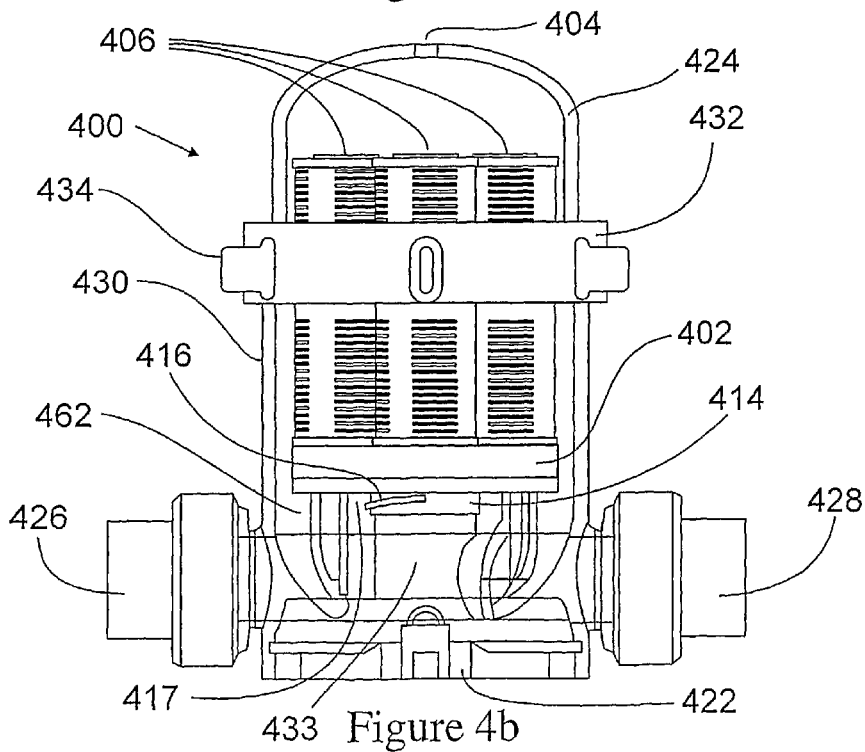
FIG. 4b is a side view of the module of FIG. 4a illustrating detents in the manifold and tabs on a retainer used to join the cap and manifold.
Figures 5A, 5B:
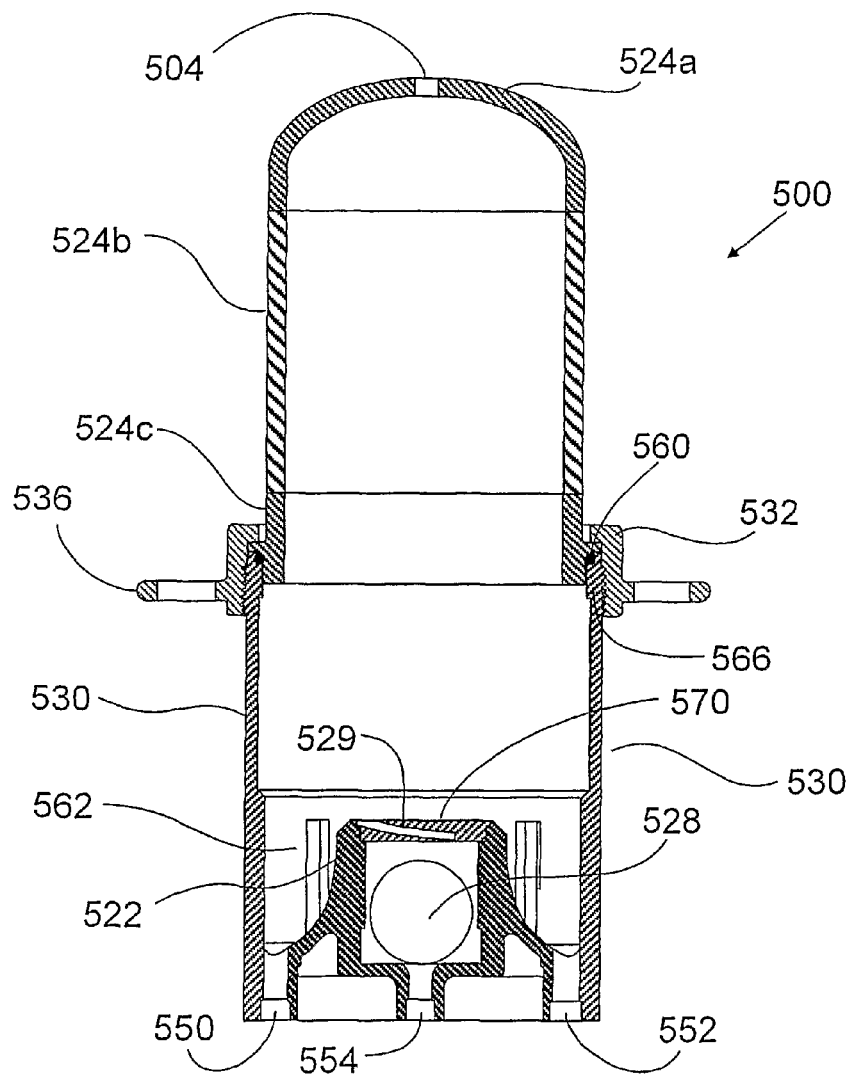
FIG. 5a is a side view of the screw flight that may be used in a manifold in an embodiment of this invention, the manifold for accepts a pitched partial screw thread on the support liquid outlet.
FIG. 5b is a cross-sectional view of a manifold and bowl in an embodiment of a purification module of this invention.
Figure 8A:
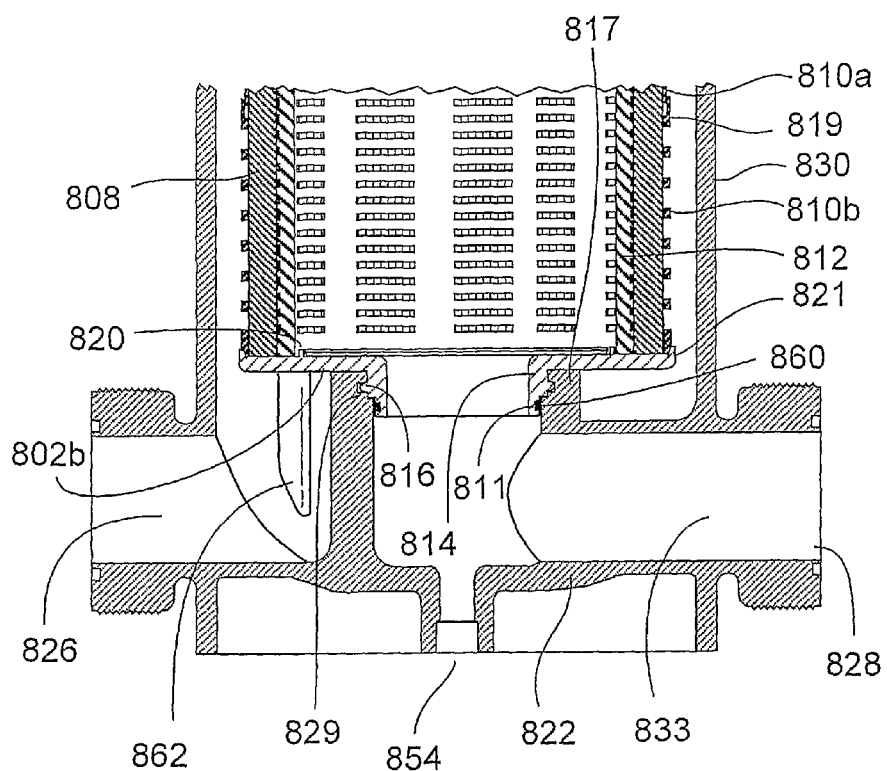
FIG. 8a is a cross section view of a purification module in an embodiment of the invention.
Figure 8B:
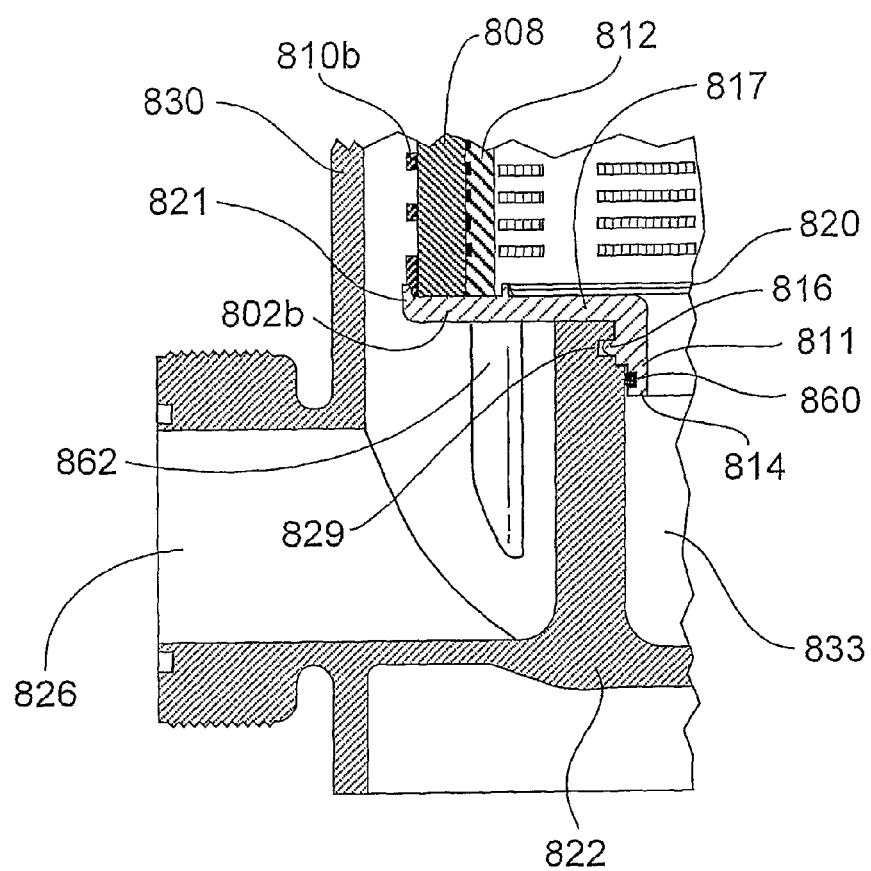
FIG. 8b is a cross sectional view of the detents and sealing between the manifold and support in embodiments of the invention.

As shown in FIG. 5*b* or FIG. 8*a* and FIG. 8*b*, one or more detents, for example 562 or 862, can be positioned along an inner surface of the manifold 522 or 822 respectively, or a wall from a section of the manifold 530 or 830 respectively, and used to provide a surface for positioning and holding a support such as 202 or 802*b* in an essentially fixed relation to the housing. The detents, for example 862 can also provide structural bracing for the manifold 822 as well as the bottom of support 802*b*. The detents 862 and a top surface 817 of an opening in the manifold outlet 833 can contact a lower surface of support 802*b* at an outer and inner portion respectively, and provide contact points and stability to the support 802*b* and can help prevent it from tilting in the housing. Similar stability would be expected for a support like 202 with multiple cartridges that also has a interior plenum. The detents 862 can be formed with a bottom portion of the manifold 822 and extend into a portion of the manifold section 830. As shown, the detent 862 can be raised from the bottom of the manifold 822 and configured to allow drainage of that portion of the manifold. A top surface of the manifold, for example 817, can optionally include a sealing material, like an o-ring, gasket, or other material, for fluidly sealing the support like 802*b* to the manifold. The detents 862 eliminates the need for the bowl to touch the cartridge to stabilize it, or eliminates the need for a top alignment plate or tie rods to hold purification cartridges or purification media in place. As illustrated in FIG. 4*b*, the detents like 462 and a top portion of the opening 417 of the manifold outlet 433 can contact the support 402 at one or more points and provide stability to the support 402 and prevent it from tilting in the housing when one or more cartridges 406 are removed or installed into the support 402 when the support is sealed to the manifold 422.

The length of the support outlet and the position of the angled structures along the length of the support fluid outlet can be chosen to provide additional stability to the support. For example, by increasing the length of the support outlet, without obstructing the manifold outlet, the stability of the support can be improved.

Materials of construction for the module components such as the manifold, cap, retainer, or purification media can be any material that is chemically compatible with the purification and or filtration process chemicals, pressure and temperature. Materials may separately include metals, or polymeric materials, or composites of polymers with various fillers such as carbon, clays, nanotubes and the like. In some embodiments the module components are polymers, in still other versions thermoplastics. In some embodiments the polymer can include polyamides, nylon, or polyolefins like high density polyethylene, ultra high molecular weight polyethylene or others; in some embodiments polymer can include fluoropolymers like tetrafluoroethylene, PFA, MFA, m-PTFE, FEP, PVDF, PVC, or others; in still other embodiments the polymer can include high temperature polymers like PEEK, PES, polysulfone, and the like.

Figure 3A:
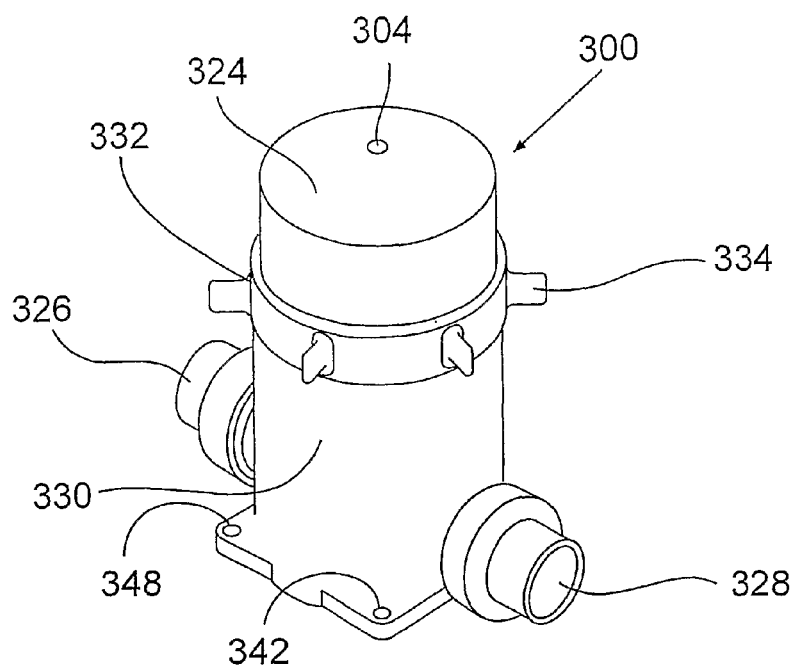
FIG. 3a is an isometric view of the purification module of FIG. 2b.
Figure 3B:
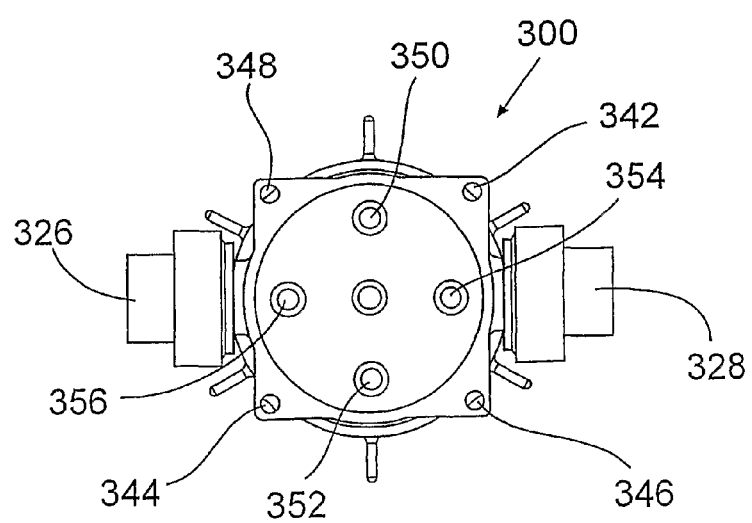
FIG. 3b is a bottom view of the purification module of FIG. 2b.
Figure 10A:
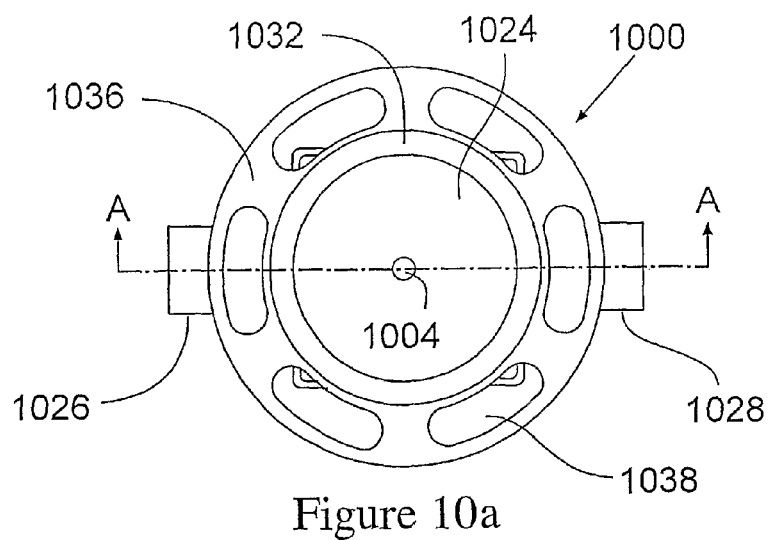
FIG. 10a is a top view of a purification module in an embodiment of this invention.
Figure 10B:
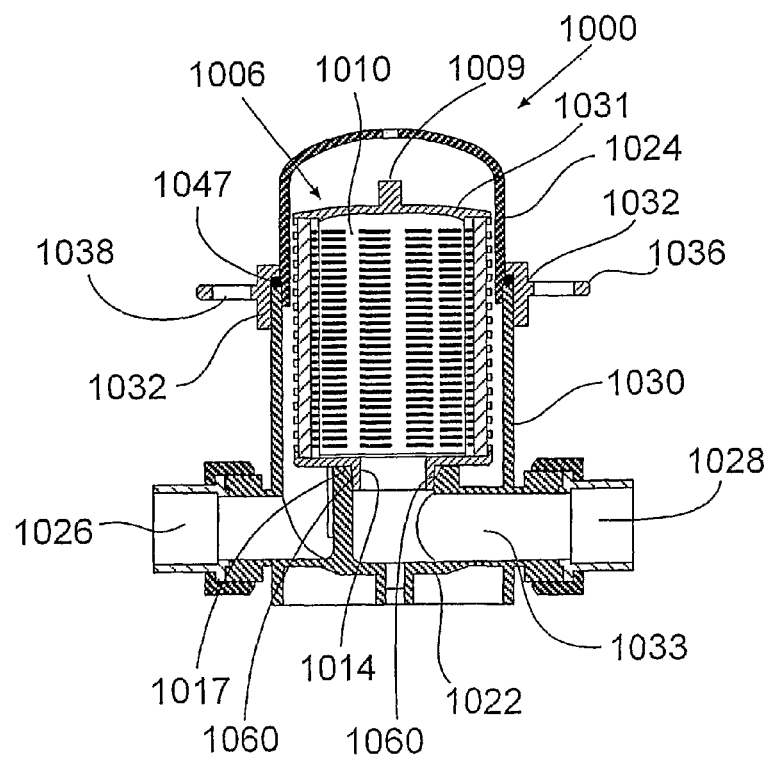
FIG. 10b is a cross sectional view of the purification module of FIG. 10a taken along line A-A and illustrating a purification cartridge in an embodiment of the invention.

FIGS. 3*a* and 3*b*, illustrate a filtration or purification module 300 having a cylindrical section 330 of the manifold with liquid inlet 326 and liquid outlet 328 and bowl or cap 324 with optional vent 304. The module 300 can be secured to a substrate or tool surface (not shown) by screws extending through holes 342, 344, 346 and 348. As shown in FIG. 3*b* (and similarly in an embodiment illustrated in FIG. 5*b*), the filtration module 300 can be provided with vent or drain hole 350 and drain hole 352 in the manifold that is in fluid communication with interior portions of the cylindrical section and outlet section of the manifold. The vent or drain hole 350, and drain hole 352, may be plugged during use and opened upon completion of filtration and or purification of the liquid. Gauge and or vent holes 354 and 356 also can be provided in the manifold to attach gauges such as pressure gauges during use. One or more gauge holes such as but not limited to 354 can be plugged during use of module 300 if one or more gauges are absent. Illustrated in FIG. 3*a* and FIG. 10*a* are non-limiting examples of a retainer that can be used to seal the manifold section and cap together. For example, retainer 332 with tabs 334, or retainer 1032 with flange 1036 maintains the seal between a cap, 324 or 1024 respectively and the manifold section 330 or 1030 respectively. The dimensional tolerance of the retainer can be chosen or made to maintain the relative position of the cap and manifold sections such that a liquid tight seal is maintained during pressure and temperature experienced during module use.

Figure 4A:
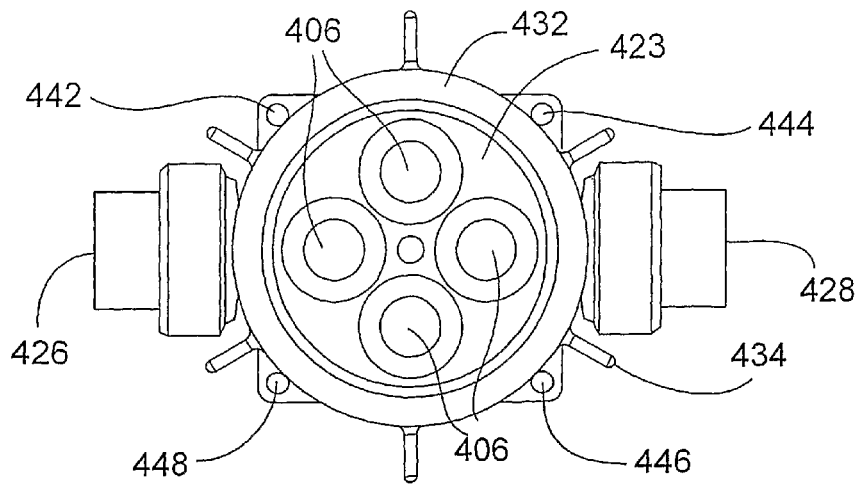
FIG. 4a is a top view of another embodiment of a purification module of this invention.

Referring to FIGS. 4*a* and 4*b*, the filtration or purification module 400 comprises a bowl or cap 424 with optional vent port 404, one or more purification or filtration cartridges 406 joined to support 402, and the manifold 422. Support 402 includes a fluid outlet 414 having pitched partial screw threads 416. An o-ring (not shown) positioned between outlet 414 and manifold 422 forms a fluid seal therebetween. The filtration module 400 can be secured to a substrate (not shown) with screws extending through holes 442, 444, 446 and 448. Bowl 424 is secured to cylindrical section 430 of manifold 422 with a retainer such as a lock ring 432 having spindles or tabs 434 for holding to turn the retaining ring 432 in the manner described above with reference to FIG. 2*a* and FIG. 2*b*. In use, fluid to be filtered enters manifold inlet 426 and passes through purification or filtration cartridge(s) 406. The treated fluid or liquid passing through the purification or filtration cartridges 406 flows through support 402, through support fluid outlet 414 and through manifold outlet conduit 433 and to manifold outlet 428 to a point of use. As would be know to one skilled in the art, it is possible to reverse the flow of fluid in various embodiments of the invention. While various embodiments have been described, the embodiments are not limited to any particular direction of fluid flow.

Referring to FIG. 5*a*, FIG. 5*b*, and also to FIG. 7, the internal surface 570 of manifold 522 can include the screw flights 529 or other similar grooves or channels which accommodate pitched partial screw threads such as 716. As shown in FIG. 5*b* in an embodiment of a filtration or purification module 500, the manifold 522 can be provided with vent or drain hole 550 and drain hole 552 which may be plugged during use and opened upon completion of filtration or purification. Gauge and or drain hole 554 can be provided to attach gauges such as pressure gauges during use. One or more gauge or drain hole 554 can be plugged during use of module 500 if one or more gauges are absent. The size of the cap or bowl 524 can be varied to accommodate the purification media or one or more cartridges. For purposes of illustration, bowl or cap 524 can include a top portion 524*a* provided with vent 504, top portions 524*a* is fluidly sealed to a middle portion 524*b* whose length can be chosen to accommodate filters or purifiers (not shown) fluidly connected to a bottom portion 524*c* which can include structures such as a flange, lip, or other suitable thicker reinforced structures 566. Bowl or cap 524 (524*a* and 524*b*, and 524*c* joined together) can be joined to manifold section 530 by a sealing material 560 and held with a retaining ring 532 with flange 536. Other reversible joining apparatus such as one or more nuts and bolts, one or more clamps and the like can also be used as a retainer to seal bowl or cap 524 and manifold section 530. Module 500 has a fluid or liquid inlet (not shown) for the fluid to be treated and an outlet 528 from a manifold outlet conduit to remove the treated fluid or treated liquid from the purification media and transfer it to the point of use. FIG. 5b illustrates one or more optional detents 562 positioned inside the manifold section 530 that can be used to hold or position a support structure like 102 in FIG. 1c or support 802b illustrated in FIG. 8a.

Referring to FIG. 7, the purification cartridge 706 in a version of this invention can include an outer porous cage that can be a flexible cage or formed from two or more segments 710a and 710b which can provide the purification cartridge with support and an optional joint 737 for thermal expansion of the cartridge 706. One of the outer porous cage segments 710a can be joined or bonded to an endcap 731 that can have a handle 709 or other grasping feature. Another porous cage segment such as 710b can be joined or bonded to a support 702b that has a fluid outlet 714. FIG. 8a illustrates an outer cage with two or more segments 810a and 810b interconnected by a tongue and groove or other similar joint 819 between the upper and lower outer cages 810a and 810b. The cartridge can further include a purification and or filtration media 708, such as a pleated membrane and one or more inner porous cage supports or a flexible inner cage support (not shown). The support fluid outlet 714 can have two or more pitched partial screw threads or other separated angled structures 716 positioned on opposing or other suitable surfaces of the support fluid outlet 714. The partial screw threads or other angled structures 716 on the outlet of the support can have a pitch (α) between about 2 degrees and 25 degrees, preferably between about 6 degrees and about 8 degrees. In some embodiments the angled structures provides movement of the support outlet about 30 millimeters into the outlet conduit of the manifold when engaged. The angle or pitch can be measured from a line 735 perpendicular to the rotational axis of the purification cartridge or support. The partial screw threads or other angles tabs or fins 716 fit into mating angled structures such as partial screw flights in a manifold. In some embodiments the purification cartridge contains a pleated purification membrane 708 positioned within the combination of supports 710a and 710b, (for an embodiment of a single section outer cage see 1010 in FIG. 10d), an endcap 731, and sealed to the support 702b. In use a fluid or liquid entering the cage 710a and 710b passes through the purification membrane 708 where particles and contaminants can be removed, the liquid exits the cartridge through support outlet 714 to a manifold.

Figure 6:
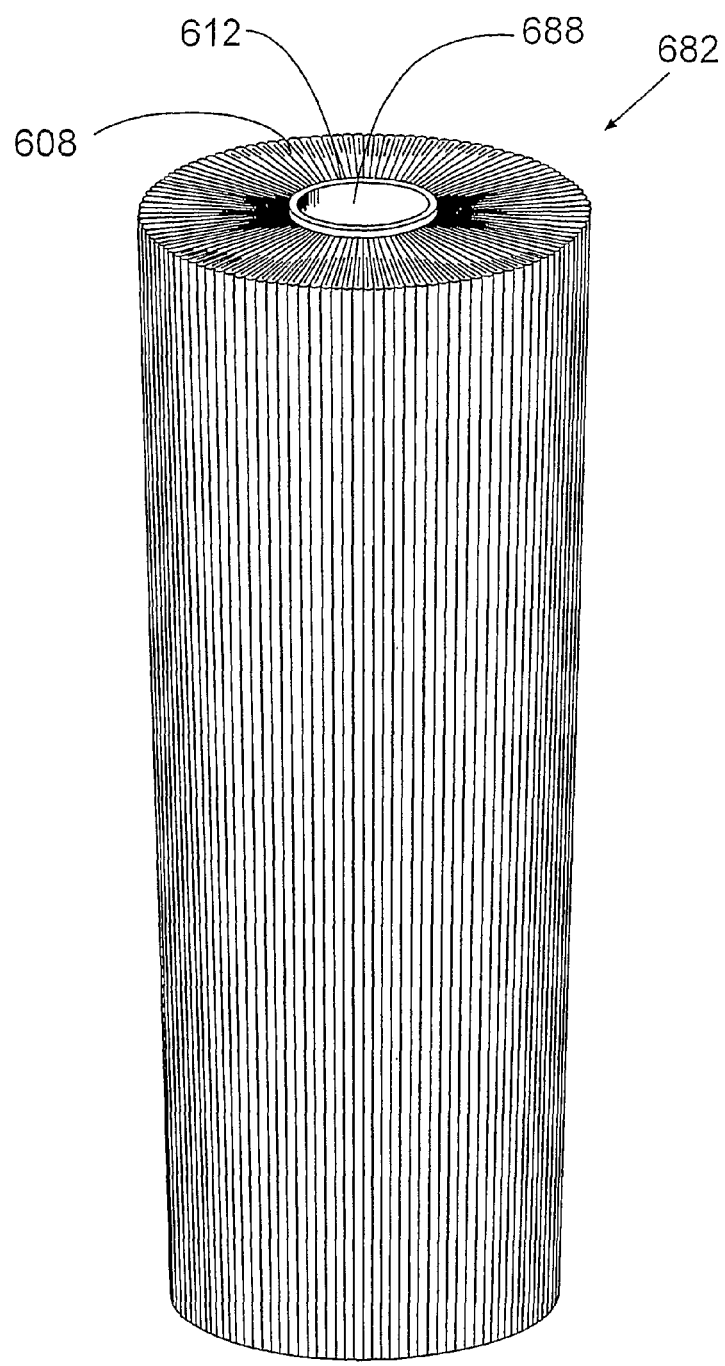
FIG. 6 is an isometric view of a portion of a purification media utilized in embodiments of the invention.

Referring to FIG. 6, a portion of filtration and or purification cartridge 682 is shown that can include a porous, microporous, or smaller pore size purification membrane 608. In some embodiments the membrane 608 is a pleated filtration membrane, in other embodiments the membrane 608 can be hollow fibers (not shown) or non-woven depth filtration media (not shown). The portion of the cartridge 682 can include a hollow support cylinder cage 612 having hole, port, or liquid outlet 688 which communicates with fluid outlet of a support such as 214 or 814 (FIG. 2a and FIG. 8). The pleats of the pleated filtration membrane also can be M shaped or W shaped, combinations of these, or other shapes. In some embodiments the cartridges may include hollow fibers porous or microporous membranes having pores with a size of about 10 micron or less, pores of about 1 micron or less, or pores of about 0.1 micron or less. As shown in an embodiment of the invention in FIG. 7, a purification cartridge may include one or more porous outer cage supports 710a and 710b, a support 702b with outlet 714 having angle structure or partial thread 716 and a groove, recess, or channel 711 for an o-ring or other sealing material (not shown). Endcap 731 may be bonded to the outer cage support 710a and can have a feature the provides leverage to rotate the cartridge to engage angled structures 716 of the outlet and mating structures on the manifold.

In an embodiment of the invention illustrated in FIG. 8a and FIG. 8b, manifold 822 can include a manifold section 830 for joining to a cap (not shown), and also one on more gauge or drain holes such as but not limited to 854. Support plate 802b is illustrated with support outlet 814, angled structure 816 mated with one or more angled channel or groove structures 829 in the fluid outlet conduit of the manifold 833. Support outlet 814 can include one or more grooves or channels 811 for an o-ring or other sealing material. As illustrated in FIG. 8b, the support outlet 814 fits into, and in some versions is essentially coaxial with, the inside of a manifold outlet conduit 833 with an opening in the manifold surface 817. The support 802b with the purification media 808 can be sealed by an elastomeric or other sealing material 860 with the manifold outlet conduit 833 in a manner which prevents mixing of a fluid or liquid feed to the module and the filtered permeate and or purified liquid removed from the purification media 808 through the outlet conduit of the manifold.

Figure 9:
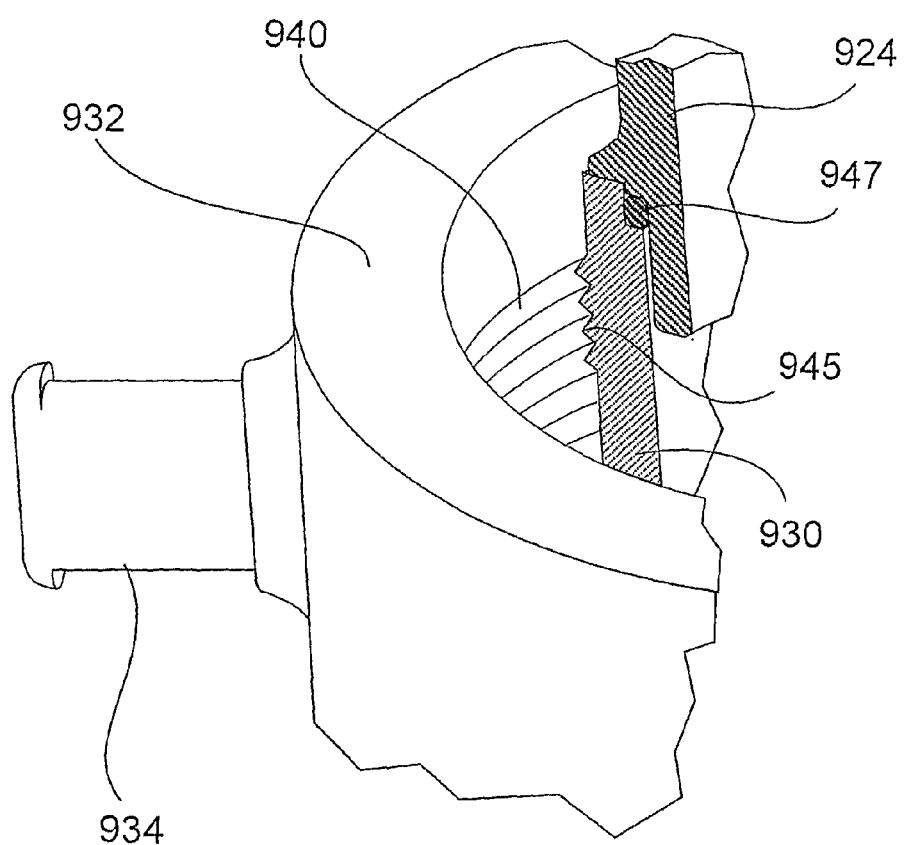
FIG. 9 is an isometric cross sectional view illustrating a liquid seal between a cap and section of the manifold utilizing a retainer in an embodiment of a purification module of this invention.

FIG. 9 illustrates an embodiment of a seal between a portion of a bowl or cap 924 and a section of the manifold 930. A portion of a retainer 932 with tabs 934 is positioned on the bowl 924 and is provided with retainer threads 940 which mate with manifold threads 945 on the outer surface of manifold section 930. When the retainer 932 is rotated to engage threads 945, bowl 924 can be sealed to manifold section 930 utilizing an o-ring or other sealing material 947.

FIG. 10a-d illustrate aspects of an embodiment of the invention comprising a manifold 1022 with one or more vent or gauge holes such as but not limited to 1054, and a bowl or cap 1024, with optional vent port 1004, joined in a fluid tight manner to a section 1030 of the manifold 1022. The bowl 1024 and manifold 1022 house a purification cartridge 1006 having support 1002b and endcap 1031 with optional handle 1009 and purification membrane 1008 fluidly sealed to the support 1002b. The support 1002b has membrane supporting portion and a support outlet 1014 where the support outlet 1014 fits into, and in some versions is essentially coaxial, the inside of a manifold outlet conduit 1033 with an opening in the manifold surface 1017. The support outlet 1014 has two or more angled structures 1016 such as but not limited to flights, grooves, fins or partial thread structures that engage with angled mating structures of the outlet conduit 1033 of the manifold. The angled structures engage and stop with less than a full turn of the support 1002b to form a fluid tight seal between the support 1002b and manifold 1022. In some embodiments the support 1002b and manifold 1022 engage and stop with a turn of about 90 degrees or less of the support 1002b. The engagement of the support 1014 and manifold outlet conduit 1033 forms a fluid tight seal 1060 for example but not limited to a reversible seal by press fit, polymeric sealing material such as gasket, o-ring, or one or more o-rings between said support outlet 1014 and outlet conduit 1033 of the manifold 1022.

The manifold 1022 is provided with a fluid inlet 1026 and a fluid outlet 1028. The manifold 1022 is conveniently formed integrally with a cylindrical section 1030 which mates in sealing relationship with bowl 1024 utilizing rotatable lock ring 1032. Lock ring 1032 can be provided with screw threads 1040 which can be engaged with manifold section screw threads 1045 by rotating the lock ring 1032. When the lock ring 1032 is rotated, bowl 1024 is sealed to cylindrical section 1030 utilizing an o-ring 1047. In some embodiments, the purifier cartridge 1006, can include outer porous cage 1010 and inner porous cage 1012, that can be sealed to a inlet to the manifold outlet conduit 1033 by partial screw threads 1016 and o-ring 1060 by being rotated into the inlet to the manifold outlet conduit 1033 using the handle 1009.

Figure 10C:
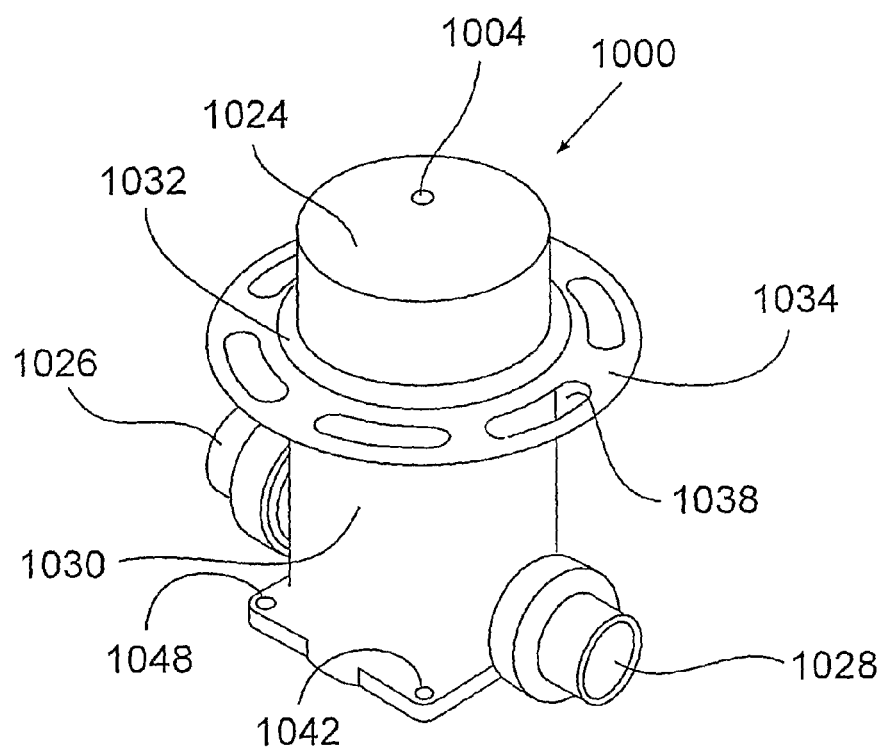

As shown in FIG. 10c, the filtration module 1000 can be secured to a substrate (not shown) by screws extending through holes 1042, 1048, and others not shown. Similar to the module shown in FIG. 3b, the module 1000 can be provided with vent or drain hole 1050 and drain hole (not shown) which may be plugged during use and opened upon completion of purification or filtration. Gauge holes can also be provided to attach gauges such as pressure gauges to the module 1000 during use.

Figure 10D:
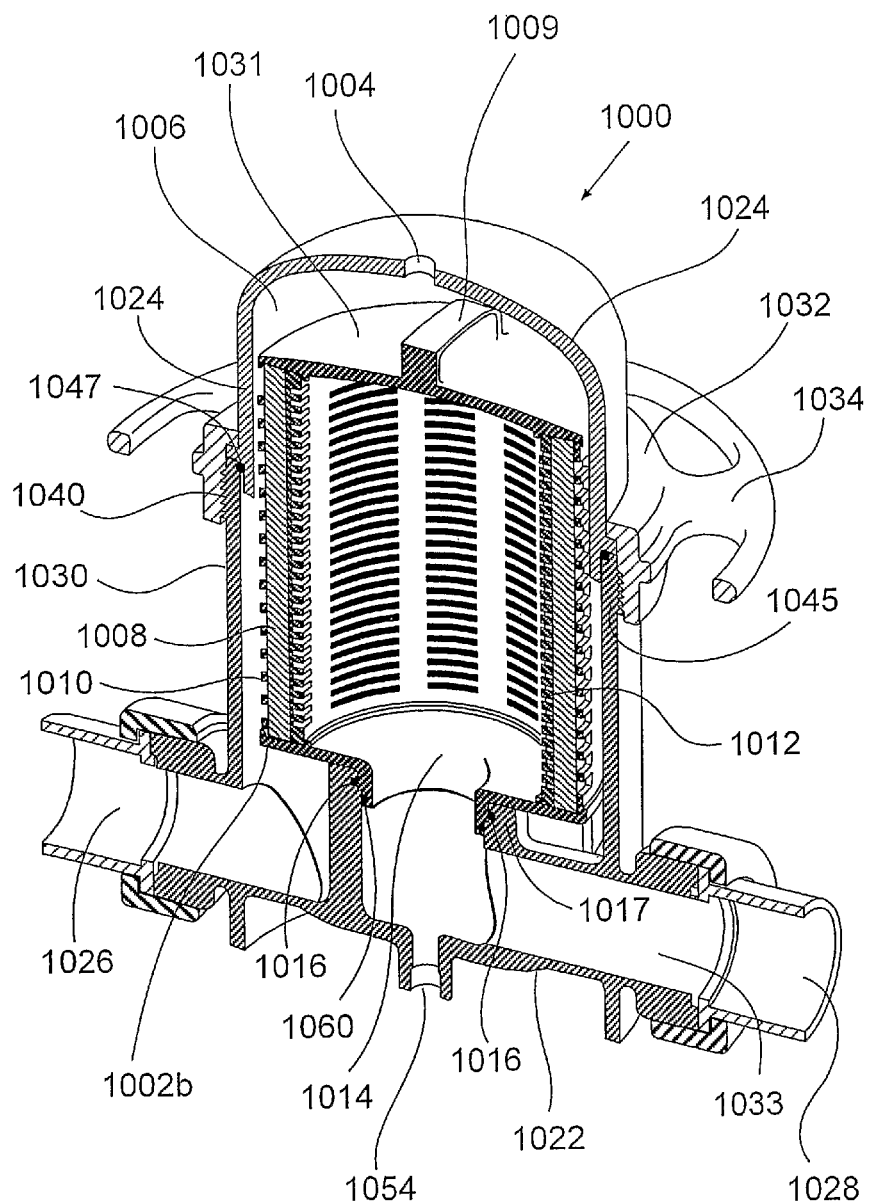
Figure 10E:
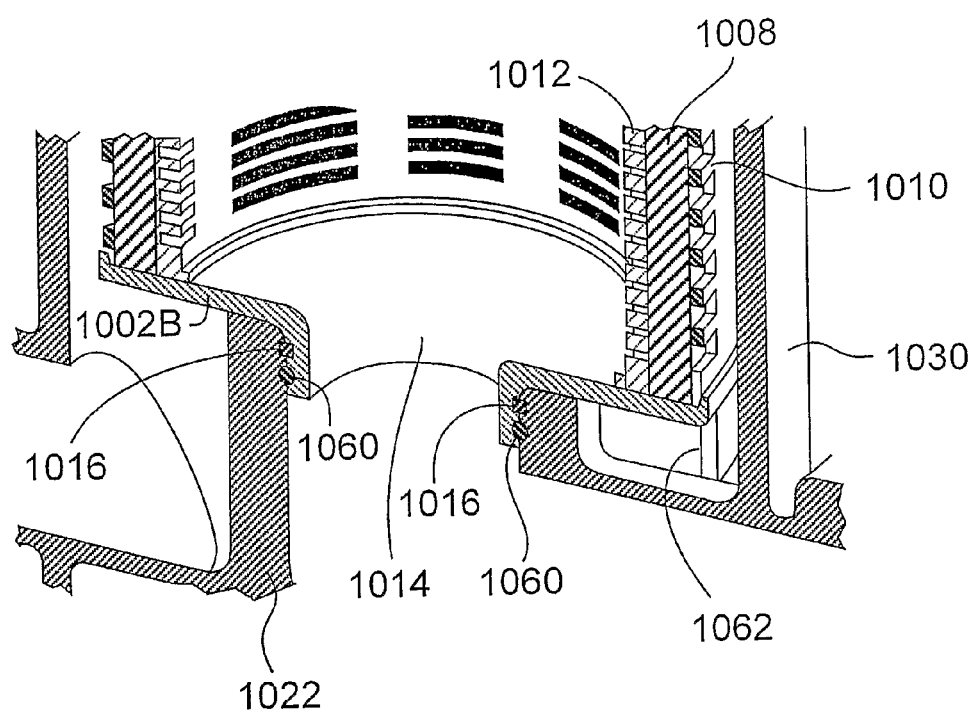
FIG. 10e is an isometric cross sectional view of the purification module of FIG. 10a further illustrating an aspect of an embodiment of the invention where the support outlet and outlet conduit of the manifold form a seal.

Further referring to FIG. 10d and FIG. 10e, in some embodiments the purification cartridge 1006 includes a fluid outlet 1014 having pitched partial screw threads 1016. An o-ring 1060 can be positioned between outlet 1014 and a portion of the outlet conduit 1033 of the manifold 1022, (similar to 860 illustrated in FIG. 8b), to form a fluid seal therebetween. The cap 1024 and manifold 1022 house the purification membrane 1008 and the purification membrane is joined to the support 1002b. In some embodiments the purification cartridge 1006 enclosed by the manifold section 1030 and cap 1024 may further include a core support 1012, an outer support cage 1010 bonded to the support 1002b, and an endcap 1031. The support 1002b has an outlet 1014 that receives purified fluid from the cartridge 1006 interior and directs it through the manifold outlet conduit 1033 to the manifold outlet 1028. The internal surface of manifold 1022 can have slots, which can be in the outlet conduit 1033, which accommodate partial screw threads 1016 from the support 1002b. In use, fluid to be filtered enters manifold inlet 1026 and enters purification or filtration cartridge 1006 where particles, gels, molecular contaminants, ionic contaminants, or any combination of these are removed from the liquid as it passes through the purification membrane 1008. Purified fluid leaves purification cartridge 1006 through support fluid outlet 1014 which is positioned inside of a manifold outlet conduit 1033 at an opening in the manifold surface 1017. The purified liquid passes through manifold outlet conduit 1033 and then to manifold outlet 1028 to a point of use.

The invention claimed is:

1. An apparatus, comprising:
 a manifold, including a cylindrical section provided with threads on an outer surface of the cylindrical section, one or more rib structures positioned along an inner surface of the manifold, a fluid inlet and a fluid outlet conduit;
 a bowl with a vent; and
 a retaining ring, configured to join said manifold and said bowl in a liquid tight manner, said retaining ring having threads which mate with threads on the outer surface of the cylindrical section of the manifold;
 said bowl and manifold housing a purification cartridge, the purification cartridge comprising a purification membrane mounted to a support in a manner which prevents mixing of a liquid feed to the apparatus and a filtered permeate from the apparatus, the purification cartridge having a membrane supporting portion, a lower surface and a support outlet,
 wherein said support outlet fits inside of the outlet conduit of the manifold and has two or more angled structures that engage with angled mating structures of the outlet conduit of the manifold with a turn of about 90 degrees or less of the support to form a liquid tight seal between said support and said manifold, and
 wherein the one or more rib structures contact one or more points of the lower surface of the support, provide a surface for positioning and holding the support, are configured to allow drainage of the manifold and act as a stop for the support in the manifold while the support is rotated to form the liquid tight seal between the support and the manifold.

2. The apparatus of claim 1, wherein the angled structures of the support outlet form an angle of between about 2 and about 25 degrees with respect to a line perpendicular to a rotational axis of the support.

3. The apparatus of claim 1 where the angled structures of the support outlet are partial threads.

4. The apparatus of claim 1 where the support outlet and manifold are sealed in a liquid tight manner by an o-ring.

5. The apparatus of claim 1 where the purification membrane is bonded to the support.

6. The apparatus of claim 1, wherein said retaining ring comprises a flange to facilitate rotation of said retaining ring.

7. The apparatus of claim 1, wherein the purification cartridge further comprises:
 an endcap with a handle,
 a porous outer cage formed from two or more mutually interlocking segments which provide the purification cartridge with support and a joint for thermal expansion of the cartridge, one of the porous outer cage segments is joined to the endcap and another porous outer cage segment is joined to the support; and
 a porous inner cage,
 wherein the purification membrane is a pleated purification membrane positioned within the combination of the two or more porous outer cage segments and the endcap and sealed to the support.

8. An apparatus, comprising:
 a manifold, including a cylindrical section provided with threads on an outer surface of the cylindrical section, one or more rib structures positioned along an inner surface of the manifold, a fluid inlet and an outlet conduit;
 a bowl with a vent;
 a retaining ring, configured to join said manifold and said bowl in a liquid tight manner, said retaining ring having threads which mate with threads on the outer surface of the cylindrical section of the manifold; and
 a support for a plurality of filtration cartridges comprising:
  a membrane supporting portion comprising a plurality of openings, each opening sized to receive a filtration cartridge,
  a lower surface,
  a fluid outlet, and
  a plenum which allows fluid flow from the plurality of openings to the fluid outlet;
 said bowl and manifold housing the plurality of filtration cartridges, each filtration cartridge sealingly joined into an opening of the support and comprising a filtration membrane,
 wherein the fluid outlet fits inside of the outlet conduit of the manifold and has two or more angled structures that engage with angled mating structures of the outlet conduit of the manifold with a turn of about 90 degrees or less of the support to form a liquid tight seal between the support and the manifold, and
 wherein the one or more rib structures contact one or more points of the lower surface of the support, provide a surface for positioning and holding the support, are configured to allow drainage of the manifold and act as a stop for the support in the manifold while the support is rotated to form the liquid tight seal between the support and the manifold.

9. The apparatus of claim 8, wherein the filtration cartridge further comprises:

an endcap with a handle, a porous outer cage formed from two or more mutually interlocking segments which provide the filtration cartridge with support and a joint for thermal expansion of the cartridge, one of the porous outer cage segments is joined to the endcap and another porous outer cage segment is sealingly joined to the support; and a porous inner cage, wherein the filtration membrane is a pleated purification membrane positioned within the combination of the two or more porous outer cage segments and the endcap and sealed to the support.

10. A purification cartridge, comprising:

an endcap with a handle;

a support including a fluid outlet having two or more angled structures on opposing surfaces of the fluid outlet, said angled structures making an angle of between 2 degrees and 25 degrees measured from a line perpendicular to a rotational axis of the support;

a porous outer cage formed from two or more mutually interlocking segments which provide the purification cartridge with support and a joint for thermal expansion of the cartridge, one of the porous outer cage segments is joined to the endcap and another porous outer cage segment is joined to the support;

a porous inner cage of a single piece construction, joined at a first end to the endcap and joined at a second end to the support; and a pleated purification membrane positioned within the combination of the two or more porous outer cage segments and the endcap and sealed to the support.

11. The purification cartridge of claim 10, wherein the joint is a tongue and groove joint.

12. The purification cartridge of claim 10, wherein said angled structures make an angle of between about 6 degrees and about 8 degrees measured from a line perpendicular to a rotational axis of said support.

13. A filtration module, comprising:

a support for a plurality of filtration cartridges, the support comprising:

a plurality of openings, each opening sized to receive a filtration cartridge, a fluid outlet having two or more angled structures positioned on opposing surfaces of the fluid outlet, said angled structures making an angle of between 2 degrees and 25 degrees measured from a line perpendicular to a rotational axis of the support, and a plenum which allows fluid flow from the plurality of openings to the fluid outlet; and a plurality of filtration cartridges, each filtration cartridge sealingly joined into an opening of the support, wherein each filtration cartridge has a filter layer, a porous outer cage surrounding the filter layer, a porous inner cage of a single piece construction supporting the filter layer and an endcap having a handle, wherein the porous outer cage is formed from two or more mutually interlocking segments which provide the filtration cartridge with support and a joint for thermal expansion of the cartridge, one of the porous outer cage segments is joined to the endcap and another porous outer cage segment is sealingly joined to the support; and the porous inner cage is joined at a first end to the endcap and joined at a second end to the support.

14. The filtration module of claim 13, wherein the joint is a tongue and groove joint.

15. The filtration module of claim 13, wherein the angled structures make an angle of between about 6 degrees and about 8 degrees measured from a line perpendicular to the rotational axis of the support.

\* \* \* \* \*